United States Patent Office 3,103,498
Patented Sept. 10, 1963

3,103,498
COMPOSITION OF MODIFIED ELASTOMERIC BUTADIENE-ACRYLONITRILE COPOLYMERS AND OF MODIFIED THERMOPLASTIC STYRENE-ACRYLONITRILE COPOLYMERS
Gottfried Scriba, Leverkusen, Wilhelm Graülich, Leverkusen-Bayerwerk, and Paul Schneider, Opladen, Germany, assignors to Farbenfabriken Bayer Aktiengesellschaft, Leverkusen, Germany, a corporation of Germany
No Drawing. Filed Apr. 15, 1958, Ser. No. 728,522
Claims priority, application Germany Apr. 20, 1957
5 Claims. (Cl. 260—45.5)

The present invention relates to new compositions of thermoplastic and elastic polymers, and to the production thereof.

For the production of articles having high impact and notch impact strength, it is known from U.S. patent specifications 2,439,202; 2,498,652; 2,505,349; 2,550,139; 2,597,951; 2,600,024 to use mixtures of thermoplastic copolymers of styrene and acrylonitrile together with rubber-like copolymers of a butadiene and acrylonitrile. It has further been proposed in former copending application Ser. No. 595,593, now U.S. Patent 2,925,399, filed on July 3, 1956, to modify the rubber-like copolymers of these mixtures by incorporating by polymerization monomers which contain carboxyl groups or spontaneously cross-linking groups.

As disclosed in U.S. Patent 2,925,399, the self-cross-linking group may be, for instance, carboxyl, amide,

methylol,

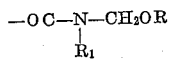

wherein R is alkyl and $R_1$ is hydrogen, alkyl or aryl;

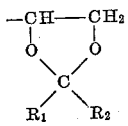

wherein each $R_1$ and $R_2$ may be hydrogen or hydrocarbon; ureido, and groups of the formula:

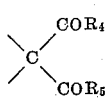

wherein $R_4$ and $R_5$ stand for either (a) a hydrocarbon radical, or (b) a hydrocarbon radical, which is bound to the carbonyl group by way of an oxygen atom.

It has now been found that an improvement in the properties of such compositions is produced if conjugated diolefines, more especially butadiene or derivatives of butadiene having 4 to 6 carbon atoms in amounts of about 1 to about 10% by weight, are incorporated by polymerization into the thermoplastic components as an additional component as well as styrene and acrylonitrile. Higher proportions cause a drop in the mechanical properties of the plastic mixtures, while lower proportions no longer show any appreciable effect. The alkyl derivatives of butadiene, such as isoprene and dimethyl butadiene can be used instead of butadiene as the additional monomer for the thermoplastic component. The ratio between the two other monomers, i.e. styrene and acrylonitrile, can be varied within relatively wide limits namely from 95–55 parts of styrene to 5–45 parts of acrylonitrile. This ratio between styrene and acrylonitrile obviously influences the properties of the resulting plastic in known manner.

The shaped structures prepared from such compositions show a better impact strength and notch impact strength than those which, in accordance with the prior known processes, do not contain any diolefines in the thermoplastic component. A particularly surprising feature is that the improvement in the impact and notch impact strength is not accompanied by a fall in the hardness, but that sometimes it is even possible to observe an increase in the hardness. It is known from the patent specifications cited above that plastics having good resistance to low temperatures are produced by increasing the amount of butadiene in the elastomeric component, but this lowers the hardness value. The properties of such cold-resistant mixtures are likewise improved in the present invention by incorporating butadiene or its derivatives into the thermoplastic component. Here also is there produced an improvement in the impact and notch impact strengths, but the hardness remains the same or is even improved; in addition there is obtained the desired improvement in the resistance to low temperatures.

Another possibility of improving the properties of known plastic mixtures is offered by the partially replaced styrene in the thermoplastic component by styrenes alkylated on the nucleus. The replacement of 10 to 90% of the styrene by nuclear-alkylated styrene, either with or without the addition of butadiene or its derivatives as comonomers, produces a rise of the softening point. o-, m- and p-methyl styrene are especially to be mentioned as styrenes alkylated on the nucleus. There come furthermore into question alkylated styrenes of the aforementioned type in which the alkyl group is ethyl, propyl or butyl.

The said copolymers are prepared in the usual way by emulsion polymerization, or even by block polymerization or bead polymerization. For improving the resistance to ageing, the copolymers containing a butadiene are stabilized with one of the known age resistors. The thermoplastic components prepared in this way are mixed with the elastic components. This can take place either by mixing the corresponding latices with subsequent precipitation, washing and drying of the polymers, or by working the polymers on the roller of a kneading worm or in a mixer. Other additives such as fillers, filler pigments, zinc stearate and the like can be incorporated into the plastics during this working up process. Reference is made in this connection to the disclosure of the aforementioned U.S. patent specifications and of U.S. Patent 2,925,399. In the following examples, the parts indicated are parts by weight.

EXAMPLE 1

A latex obtained by emulsion polymerization of 61.5 parts of butadiene with 35 parts of acrylonitrile, 3 parts of methacrylic acid and 0.5 part of divinyl benzene (Defo 1700/42.0) is so mixed with the different copolymer latices hereinafter described that, by relation to the polymer content, 30 parts of the above elastic copolymer are used with 70 parts of the copolymers hereinafter described.

(a) Copolymer latex consisting of 80 parts of styrene and 20 parts of acrylonitrile (intrinsic viscosity 1.2).

(b) Latex obtained by polymerization of 75 parts of styrene, 20 parts of acrylonitrile and 5 parts of butadiene (intrinsic viscosity 1.35).

(c) Latex obtained by polymerization of 77.5 parts of styrene, 20 parts of acrylonitrile and 2.5 parts of butadiene (intrinsic viscosity 1.5).

After being carefully mixed, the latices are precipitated by adding a sodium chloride solution, whereupon the resulting coagulates are washed and dried at 60–90° C.

The dried materials are homogenized at 170° C. on a double spindle worm and the web discharging from the latter is granulated. The following Table 1 shows the mechanical values of these mixtures:

*Table 1*

|  | a | b | c |
|---|---|---|---|
| Impact bending strength, kgcm./cm.² | 96 | 107 | 102 |
| Notch impact strength, kgcm./cm.²: |  |  |  |
| at 20° C | 28.0 | 31.5 | 30.0 |
| at 0° C | 10.5 | 8.5 | 7.5 |
| Bending strength (Flexural) | 640 | 670 | 680 |
| Compressive strength | 425 | 420 | 430 |
| Brinell hardness: |  |  |  |
| 10″ | 652 | 674 | 660 |
| 60″ | 616 | 649 | 620 |

Examples (b) and (c) show better notch impact strengths than (a) at 20° C., with a simultaneous rise in the impact bending strength and the Brinell hardness.

EXAMPLE 2

65 parts of a copolymer of 5% of butadiene with 25% of acrylonitrile and 70% of styrene ($\eta_i$:1.7), 17.5 parts of a copolymer of 77 parts of butadiene and 20 parts of acrylonitrile, 3 parts of methacrylic acid (Defo 1250/37.0), 17.5 parts of a copolymer of 60.5 g. of butadiene, 36% of acrylonitrile, 3.0% of methacrylic acid and 0.5% of divinyl benzene (Defo 1700/39.0) are mixed with 15 parts of titanium dioxide and further processed as described in the first example. The plastic which is obtained shows the mechanical values indicated under 2b in the following table.

If a copolymer of 75% of styrene and 25% of acrylonitrile is used instead of the thermoplastic component containing butadiene which is used in this case, then under otherwise the same conditions and with concurrent use of otherwise the same components, a material is formed which has the values set out below under 2a.

*Table 2*

|  | 2a | 2b |
|---|---|---|
| Impact strength, kgcm./cm.² | 92.0 | 92.0 |
| Notch impact strength, kgcm./cm.²: |  |  |
| at 20° C | 35.0 | 38.0 |
| at 0° C | 27.0 | 33.0 |
| at −15° C | 21.5 | 25.0 |
| at −30° C | 17.0 | 20.0 |
| Bending strength (kg./cm.²) (Flexural) | 580 | 570 |
| Compressive strength (kg./cm.²) | 350 | 360 |
| Tensile strength (kg./cm.²) | 350 | 350 |
| Brinell hardness: |  |  |
| 10″ | 585 | 650 |
| 60″ | 540 | 566 |

The addition of the butadiene to the thermoplastic components has therefore caused in this mixture an improvement in the resistance to cold with a simultaneous raising of the notch impact strength, the impact strength and the hardness.

EXAMPLE 3

As described in Example 1, a latex prepared by emulsion polymerization of 64 parts of butadiene with 35 parts of acrylonitrile and 1 part of methacrolein with the Defo value 675/20.0 is mixed in each case with one of the latices described below, so that 70 parts of the thermoplast described below are used to 30 parts of the above elastomer:

(a) Copolymer of 25 parts of acrylonitrile and 75 parts of styrene (intrinsic viscosity 1.5).

(b) Copolymer of 2.5 parts of isoprene, 72.5 parts of styrene, 25 parts of acrylonitrile (intrinsic viscosity 1.6).

The materials are processed in exactly the same way as indicated in the first example. The two mixtures then provide the following mechanical data:

*Table 3*

|  | a | b |
|---|---|---|
| Impact strength, kgcm./cm.² | 105 | 112 |
| Notch impact strength, kgcm./cm.²: |  |  |
| at 20° C | 24.5 | 27.5 |
| at 0° C | 8.0 | 9.0 |
| Brinell hardness: |  |  |
| 10″ | 620 | 673 |
| 60″ | 595 | 644 |

EXAMPLE 4

Proceeding as set out in Example 3 and using, instead of the elastic component described therein, a latex of the copolymer of 61.5 parts of butadiene with 35.5 parts of acrylonitrile and 3 parts of methacrylamide-N-methylolmethyl ether (see application Serial No. 595,593, filed on July 3, 1956) with the Defo value 1800/40.0, materials having the values indicated in Table 4 are obtained by using in other respects the same process as referred to in the same example. In the table, a represents the thermoplastic component without isoprene and b the thermoplastic component containing isoprene.

*Table 4*

|  | a | b |
|---|---|---|
| Impact strength, kgcm./cm.² | 109 | 115 |
| Notch impact strength, kgcm./cm.² |  |  |
| at 20° C | 29.5 | 32.0 |
| at 0° C | 6.5 | 8.0 |
| Brinell hardness: |  |  |
| 10″ | 635 | 692 |
| 60″ | 616 | 663 |

EXAMPLE 5

A copolymer latex prepared by polymerization of 59.5 parts of butadiene with 35 parts of acrylonitrile, 0.5 part of divinyl benzene and 5 parts of methacrylic acid (Defo value 1500/41.0) is mixed with each of the following latices of a thermoplastic polymer, so that always 70 parts of one of the thermoplastics described below are used to 30 parts of the above elastomer:

(a) Copolymer of 75 parts styrene with 25 parts of acrylonitrile (intrinsic viscosity 1.3).

(b) Copolymer of 37.5 parts of styrene with 37.5 parts of p-methyl styrene and 25 parts of acrylonitrile (intrinsic viscosity 1.25).

The precipitation of the latex mixtures and the washing, drying and further processing of the polymers is in accordance with Example 1.

The thermoplastic plastics which are obtained have the following mechanical properties:

*Table 5*

|  | a | b |
|---|---|---|
| Impact strength (kgcm./cm.²) immediately | 93 | 95 |
| After ageing for 24 hours | 100 | 100 |
| After ageing for 48 hours in the refining furnace at 100° C | specimens shrunk | 102 |
| Notch impact strength kgcm./cm.²: |  |  |
| at 20° C | 24.5 | 24.0 |
| at 0° C | 7.0 | 6.5 |
| Vicat degree | 95 | 115 |

The material containing methyl styrene is therefore particularly characterized by a higher heat resistance.

EXAMPLE 6

Using the same elastomer as in Example 5, but replacing the thermoplastic component therein by a copolymer of 50 parts of m-ethyl styrene, 5 parts of butadiene, 20 parts of styrene, 25 parts of acrylonitrile of an intrinsic viscosity of 1.4, a material having the following properties is obtained under the same conditions as in Example 5.

Table 6

| | |
|---|---|
| Impact strength, kgcm./cm.² immediately | 90.0 |
| After ageing for 24 hours | 89.5 |
| After ageing for 48 hours in the refining furnace at 100° C. | 88.5 |
| Notch impact strength kgcm./cm.²: | |
| At 20° C. | 25.0 |
| At 0° C. | 7.9 |
| Vicat degree | 114 |

EXAMPLE 7

A plastic having good resistance to cold is formed by mixing the following three copolymer latices, followed by processing as described in the preceding examples.

Thermoplastic component: copolymer of 37.5 parts of o-methyl styrene, 37.5 parts of styrene, 25 parts of acrylonitrile (intrinsic viscosity 1.4).

Elastomeric components:
(1) Copolymer of 64.5 parts of butadiene, 33 parts of acrylonitrile, 0.5 part of divinyl benzene, 20 parts of methacrylic acid (Defo value 1550/39.0).
(2) Copolymer of 79.5 parts of butadiene with 18 parts of acrylonitrile, 0.5 part of divinyl benzene, 2 parts of methacrylic acid. The latices are so mixed that 17.5 parts of the two elastomeric components are used in each case with 65 parts of the thermoplastic component.

The material obtained after working up as described above has the following mechanical properties:

Table 7

| | |
|---|---|
| Impact strength kgcm./cm.² | 85.0 |
| After ageing for 24 hours | 84.5 |
| After ageing for 48 hours in the refining furnace at 100° C. | 85.0 |
| Notch impact strength kgcm./cm.²: | |
| At 20° C. | 35.0 |
| At 0° C. | 27.5 |
| At −15° C. | 22.0 |
| At −30° C. | 19.0 |
| Vicat degree | 113 |

The latices referred to above contain about 25 to 40% by weight of the disclosed copolymers and are produced according to the prescriptions disclosed in copending application Serial No. 595,593, filed on July 3, 1956. The proportions in which the thermoplastic and elastomeric copolymers are applied also correspond to those disclosed in the aforementioned application.

We claim:
1. A composite thermoplastic material comprising (1) 30–35 parts by weight of a rubber-like copolymer of a conjugated diolefin having 4–6 carbon atoms, acrylonitrile, and 0.1–20% by weight of a monomer selected from the group consisting of methacrylic acid, methacrolein, and methacrylic acid amide-N-methylolalkyl-ether, and (2) 65–70 parts by weight of a thermoplastic copolymer selected from the group consisting of (a) copolymers of 1–10% by weight of a conjugated diolefin having 4–6 carbon atoms, 5–45% by weight of acrylonitrile, and 94–45% by weight of styrene, and of (b) copolymers of styrene and 5–45% by weight of acrylonitrile in which 10–90% of the styrene is substituted in the benzene nucleus by an alkyl group having 1–4 carbon atoms.

2. The composite thermoplastic mixture of claim 1 wherein said rubber-like copolymer contains incorporated therein by copolymerization about 0.5% by weight of divinyl benzene.

3. A composite thermoplastic material comprising (1) 30–35 parts by weight of a rubber-like copolymer of a conjugated diolefin having 4–6 carbon atoms, acrylonitrile, and 0.1–20% by weight of a monomer selected from the group consisting of methacrylic acid, methacrolein, and methacrylic acid amide-N-methylolalkyl-ether, and (2) 65–70 parts by weight of a thermoplastic copolymer of 1–10% by weight of a conjugated diolefin having 4–6 carbon atoms, 5–45% by weight of acrylonitrile, and 94–45% by weight of styrene.

4. A composite thermoplastic material comprising (1) 30–35 parts by weight of a rubber-like copolymer of a conjugated diolefin having 4–6 carbon atoms, acrylonitrile, and 0.1–20% by weight of a monomer selected from the group consisting of methacrylic acid, methacrolein, and methacrylic acid amide-N-methylolalkyl-ether, and (2) 65–70 parts by weight of a thermoplastic copolymer of styrene and 5–45% by weight of acrylonitrile in which 10–90% of the styrene is substituted in the benzene nucleus by an alkyl group having 1–4 carbon atoms.

5. A shaped plastic article produced from a composite thermoplastic mixture, said thermoplastic mixture comprising (1) 30–35 parts by weight of a rubber-like copolymer of acrylonitrile, a conjugated diolefin having 4–6 carbon atoms, and 0.1–20% by weight of a monomer selected from the group consisting of methacrylic acid, methacrolein, and a methacrylamide-N-methylol-alkyl-ether, and (2) 65–70 parts by weight of a thermoplastic copolymer selected from the group consisting of (a) copolymers of 1–10% by weight of a conjugated diolefin having 4–6 carbon atoms, 5–45% by weight of acrylonitrile, and 94–45% by weight of styrene, and of (b) copolymers of styrene and 5–45% by weight of acrylonitrile in which 10–90% of the styrene is substituted in the benzene nucleus by an alkyl group having 1–4 carbon atoms.

References Cited in the file of this patent

UNITED STATES PATENTS

| | | |
|---|---|---|
| 2,543,844 | Fryling | Mar. 6, 1951 |
| 2,614,093 | Wheelock | Oct. 14, 1952 |
| 2,702,284 | Brock | Feb. 15, 1955 |
| 2,925,399 | Schneider et al. | Feb. 16, 1960 |